United States Patent [19]

Kim

[11] Patent Number: 5,335,103
[45] Date of Patent: Aug. 2, 1994

[54] DOUBLE SEAL PATTERN FOR A LIQUID CRYSTAL DEVICE WITH CURVED ENDS

[75] Inventor: Sung Y. Kim, Kyungki, Rep. of Korea

[73] Assignee: Samsung Electronics Co., Ltd., Kyungki, Rep. of Korea

[21] Appl. No.: 24,173

[22] Filed: Feb. 22, 1993

[30] Foreign Application Priority Data

Feb. 21, 1992 [KR] Rep. of Korea ............... 92-2668

[51] Int. Cl.⁵ ............................................. G02F 1/1339
[52] U.S. Cl. ............................................. 359/80; 359/62
[58] Field of Search ........................... 359/80, 82, 62

[56] References Cited

FOREIGN PATENT DOCUMENTS

| | | |
|---|---|---|
| 57-135922 | 8/1982 | Japan . |
| 60-101520 | 6/1985 | Japan . |
| 60-120320 | 6/1985 | Japan . |
| 59-116717 | 7/1985 | Japan . |
| 60-146228 | 8/1985 | Japan . |
| 1229227 | 9/1989 | Japan . |
| 1254920 | 10/1989 | Japan . |
| 2183073 | 5/1987 | United Kingdom . |

*Primary Examiner*—William L. Sikes
*Assistant Examiner*—Kenneth Parker
*Attorney, Agent, or Firm*—Cushman, Darby & Cushman

[57] ABSTRACT

A seal pattern of a liquid crystal display ("LCD") is disclosed. First and second seal patterns are formed on a substrate having an active area thereon so as to surround the active area. The second seal pattern is provided with a second liquid crystal injection port which has free ends which are outwardly turned to form a hook shaped cross-section.

4 Claims, 1 Drawing Sheet

DOUBLE SEAL PATTERN FOR A LIQUID CRYSTAL DEVICE WITH CURVED ENDS

BACKGROUND OF THE INVENTION

The present invention relates to a seal pattern of a liquid crystal display ("LCD"), and more particularly, to a seal pattern of an LCD in which a high quality seal pattern can be repeatedly manufactured.

2. Description of the Related Art

LCD's that are widely used in very small portable TV's and laptop or notebook-type computers consume less power than conventional cathode ray tube displays. These LCD's also make such devices lighter and thinner. Thus, LCD's are finding more and more use. A conventional LCD includes an upper substrate having a common electrode, a lower substrate having pixel electrodes and thin film transistors, metal wiring, etc., for activating the pixel electrodes, a seal pattern for sealing the upper and lower substrates with a predetermined gap therebetween, and a liquid crystal material filling the space between the upper and lower substrates.

FIG. 1 is a plan view of a conventional LCD. An rectangular active area 11 is formed on a central part of a lower substrate 12 made of transparent glass. Pixel electrodes and thin film transistors, metal wiring, capacitors, etc. , for activating the pixel electrodes are provided on the active area 11. A seal pattern 13 is also formed on the lower substrate 12 about the active area 11, spaced a predetermined distance therefrom.

A liquid crystal injection port 14 for injecting the liquid crystal material is provided on one side of the seal pattern 13 as seen in FIG. 1. A seal bar 15 is formed between the liquid crystal injection port 14 and the active area 11. An end seal 16 is provided for sealing the injection port 14. The seal bar 15 prevents the end seal 16 from penetrating into the interior of seal pattern 13. The seal pattern 13, seal bar 15, and end seal 16 are formed with a predetermined height corresponding to the gap between the upper and lower substrates. The seal pattern 13, seal bar 15, and end seal 16 are formed by an adhesive insulating epoxy or the like.

The assembly process of the conventional LCD after forming the seal pattern 13 and the seal bar 15 on the lower substrate is as follows.

The upper substrate (not shown) having a common electrode is positioned and mounted on the lower substrate 12 having seal pattern 13 and seal bar 15 formed thereon. A predetermined amount of pressure is applied to the upper substrate and lower substrate 12 and heat is applied to harden material constituting the seal pattern 13 and seal bar 15. The liquid crystal is then injected through the liquid crystal injection port 14 after a vacuum is created in the space between the upper and lower substrates. Lastly, a cleaning process to remove loose epoxy debris is performed after sealing the liquid crystal injection port 14 with end seal 16.

In the above-described seal pattern process for a conventional LCD, the upper substrate is pressed during a heat treatment step after the upper substrate has been mounted on the lower substrate. At this time, pressure is typically not evenly applied to the seal pattern, causing the gap between the substrates to be irregular. This diminishes the operational reliability of the LCD.

In addition, the seal pattern integrity can be broken be dirt, chemicals, or other contaminants on the seal pattern, or the upper and lower substrates when the gap between the substrates is in a vacuum state. This again diminishes the quality of the LCD.

Finally, the end seal may leak during the cleaning process (typically a brushing process), again diminishing the quality of the LCD. Specifically, the integrity of the end seal is dependent on secure adhesion between the end seal and the injection port. This adhesion is susceptible to being disrupted during the cleaning process.

SUMMARY OF THE INVENTION

It is an object of the present invention to solve the above-identified problems by providing a seal pattern of an LCD which can endure the pressure applied to an upper substrate during the above-described heat treatment step, so as to make the gap between the upper and lower substrates of the LCD consistent, thereby improving the reliability of the LCD.

It is another object of the present invention to provide a seal pattern which can maintain its integrity in spite of the presence of dirt or chemicals thereon when the gap between the substrates is subjected to a vacuum.

It is a further object of the present invention to provide a seal pattern which remedies the problem of the end seal leaking during the above-described cleaning process, after the liquid crystal injection port is sealed with the end seal.

A seal pattern of an LCD according to the present invention comprises a first seal pattern provided with a first liquid crystal injection port, formed on a substrate having an active area; a seal bar formed on the substrate between the active area and the first liquid crystal injection port; a second seal pattern provided with a second liquid crystal injection port, formed around the first seal pattern such the second injection port surrounds the first injection port.

DESCRIPTION OF THE DRAWINGS

The objects and features of the present invention will become more apparent on consideration of the following description with reference to the accompanying figures, in which a selected example embodiment is illustrated by way of example, and not by way of limitation.

DETAILED DESCRIPTION OF THE PREFERRED EMBODIMENT

A preferred embodiment of a seal pattern of an LCD according to the present invention will be described in detail below with reference to the appended drawings.

Figure 1:
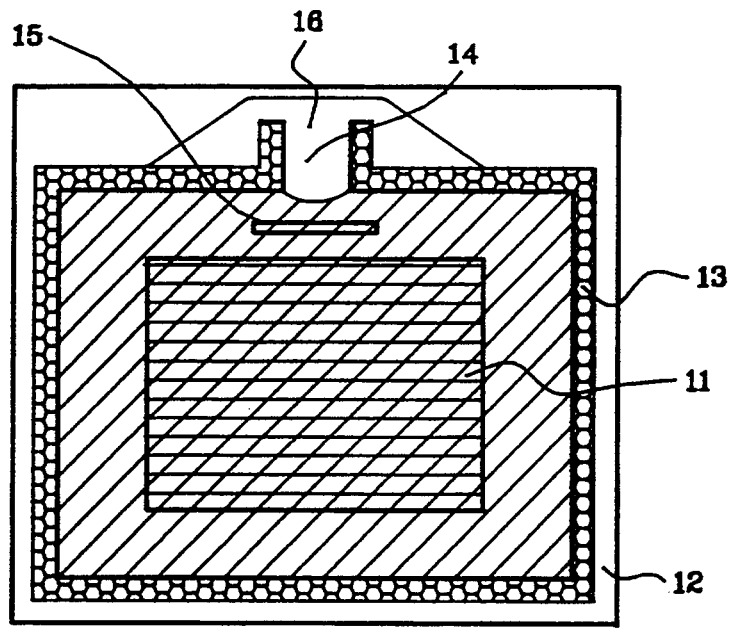
FIG. 1 is a plan view of a convention seal pattern of an LCD.
Figure 2:
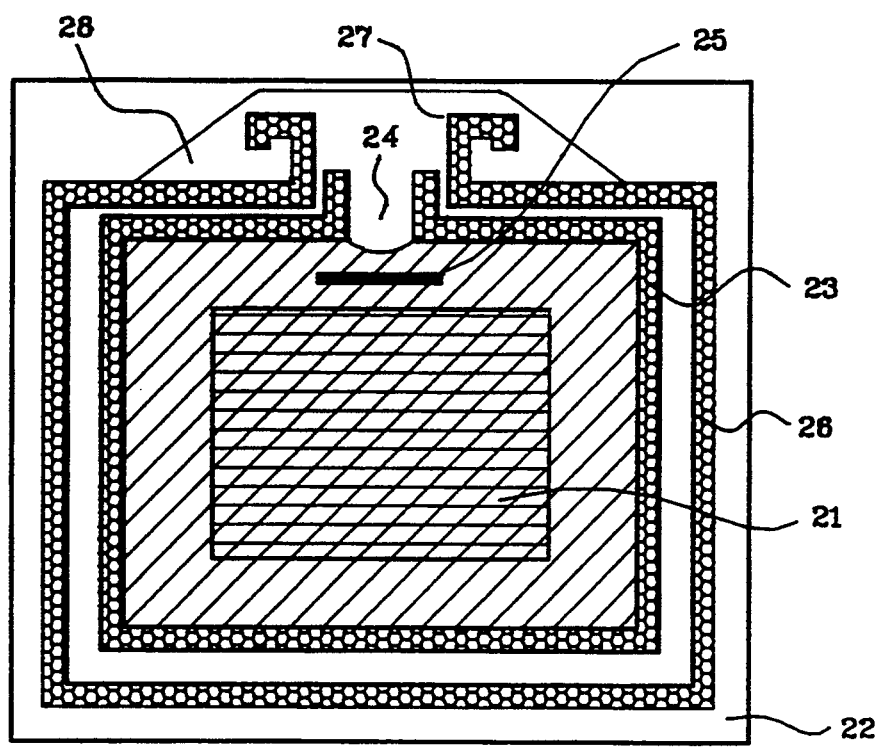
FIG. 2 is a plan view of a seal pattern of an LCD according to the present invention.

As seen in FIG. 2, an active area 21 is formed at a central part of a lower substrate 22 made of transparent glass. Pixel electrodes for driving the liquid crystal, thin film transistors, metal wiring capacitors, and other known components to activate the pixel electrodes are provided on the active area 21. A first seal pattern 23 is formed on the lower substrate 22 about the active area 21 spaced about 1–3 mm away therefrom. A first liquid crystal injection port 24 for injecting the liquid crystal into the space between the upper and lower substrates is defined at one side of the first seal pattern 23. A seal bar 25 is formed between the first liquid crystal injection port 24 and the active area 21 to prevent end seal 28 from penetrating into the gap between the upper and lower substrates and thus the active area after the liquid crystal is injected.

A second seal pattern 26 is formed around the first exterior of the first seal pattern 23 at a predetermined distance therefrom. A second liquid crystal injection port 27 is defined on a side of the second liquid crystal seal pattern 26. The outermost ends of second liquid crystal injection port 27 are turned outward in a hook shape as seen in FIG. 2 and flank the first liquid crystal injection port 24. Accordingly, even though the first seal pattern 23 may be contaminated by dirt or chemicals during the assembly of the LCD, the second seal pattern 26 prevents what leakage of the liquid crystal which may occur. Furthermore, the portion of end seal 28 corresponding to the first liquid crystal injection port 24 and the hook shaped injection port 27 is protected from damage during the cleaning process by the hook shaped injection port 27. The end seal 28 is formed so as to seal the first and second liquid crystal injection ports 24 and 27, respectively.

The first seal pattern 23, seal bar 25, second seal pattern 26, and end seal 28 are made of an adhesive insulating epoxy. The dimensions of the components are determined according to the gap established between the upper and lower substrates. The distance between the first and second seal patterns 23 and 26 is far enough that should the first seal pattern 23 be broken, the second seal pattern would not necessarily also be broken by the same cause (e.g., by the pressure applied to the upper substrate during the heat treatment step).

The first seal pattern 23, seal bar 25, second seal pattern 26, and end seal 28 may alternatively be formed on the upper substrate.

As described herein, first and second seal patterns are formed to surround an active area formed on a substrate of an LCD. The second seal pattern has a second liquid crystal injection port, the outermost ends of which are turned outwardly to form a hook shape.

Thus, according to the present invention, the double seal between the upper and lower substrates endures pressure applied to the substrates during LCD manufacture better than the single seal of the conventional technology. A more uniform gap between the upper and lower substrates of the LCD is thereby obtained which improves the reliability of the device.

Further, according to the present invention, the second seal pattern 26 prevents leakage of liquid crystal material, even though the integrity of the first seal pattern 23 may be broken.

The hook-shaped structure of the second injection port 27 helps ensure that a good seal is established by the end seal 28 because the hook-shaped structure increases the surface area for adhesion between the end seal 28 and the injection port 27.

The present invention is in no way limited to the embodiment described hereinabove. Various modifications of the disclosed embodiment will become apparent to persons skilled in the art with reference to the description of the present invention. Therefore, the appended claims cover any such modifications or other embodiments as fall within the true scope of the present invention.

What is claimed is:

1. A seal pattern formed on a substrate of a liquid crystal display having an active area, comprising:
   (a) a first seal pattern surrounding said active area on said substrate and which defines a first liquid crystal injection port at one side thereof; and
   (b) a second seal pattern formed around and exterior to said first seal pattern and which defines a second liquid crystal injection port corresponding in location to said first liquid crystal injection port, said second seal pattern having two ends having a first portion, each end being turned outwardly from said active area at said first and second liquid crystal injection ports and having a second portion being outwardly turned from said first portion.

2. A seal pattern of a liquid crystal display according to claim 1, further including an end seal for sealing said first and second liquid crystal injection ports and a seal bar formed on said substrate between said active area and said first liquid crystal injection port, said seal bar being adapted to prevent said end seal from penetrating into said active area.

3. A seal pattern of a liquid crystal display according to claim 1, wherein said first seal pattern, said second seal pattern, and said seal bar are made of an adhesive insulating epoxy.

4. A seal pattern of a liquid crystal display according to claim 1, wherein each end in said second seal pattern further includes a third portion extending toward said active region.

* * * * *